R. PEDERSON.
VEHICLE ATTACHMENT.
APPLICATION FILED SEPT. 21, 1916.
1,228,594.
Patented June 5, 1917.
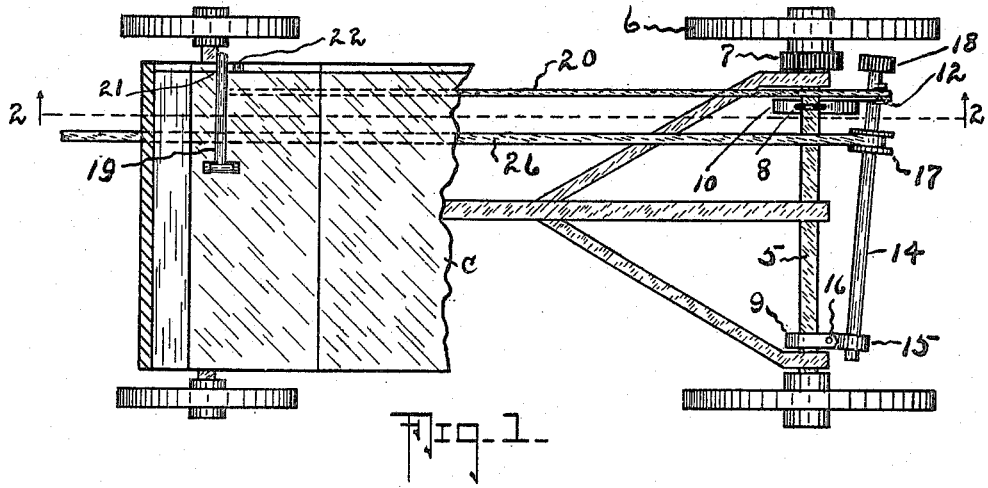
Fig. 1.
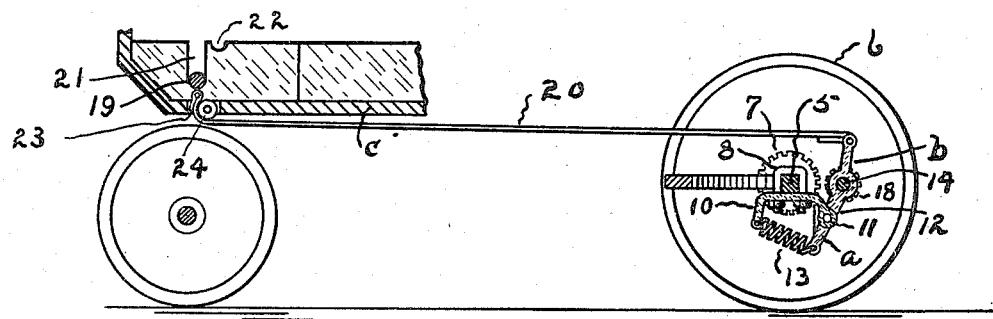
Fig. 2.
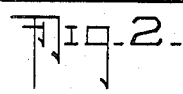
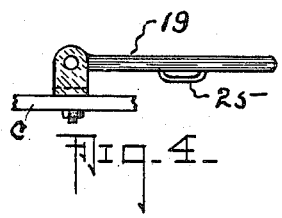
Fig. 4.
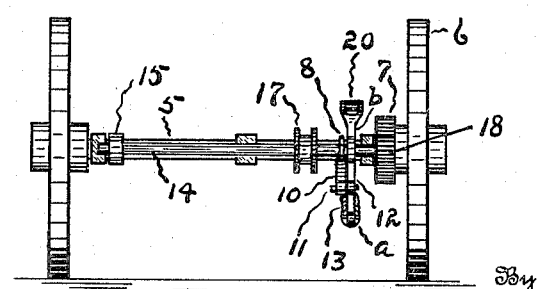
Fig. 3.
Inventor
Rasmus Pederson,
By
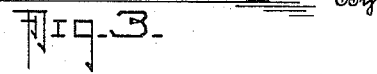
Attorney

UNITED STATES PATENT OFFICE.

RASMUS PEDERSON, OF EAST OMAHA, NEBRASKA.

VEHICLE ATTACHMENT.

1,228,594. Specification of Letters Patent. Patented June 5, 1917.

Application filed September 21, 1916. Serial No. 121,407.

*To all whom it may concern:*

Be it known that I, RASMUS PEDERSON, a citizen of the United States, residing at East Omaha, in the county of Douglas and State of Nebraska, have invented certain new and useful Improvements in Vehicle-Attachments, of which the following is a specification.

This invention relates to a safety device for horse-driven vehicles, and has for its principal object to provide an attachment for the vehicle which may be so arranged that it will operate automatically to draw the bits of the bridles upon the horses rearwardly if they move forwardly. The device to be described is used for the same purpose as the drag heretofore generally used consisting of a weight and strap, the strap being connected with the bits and the weight cast upon the ground to operate as a drag, and not being actually effective for securing a team.

The invention consists, briefly, of the combination with a wheel hub provided with a toothed gear, of a shaft provided with a spool and a pinion, said shaft being adapted to have a swinging movement under control of the driver to cause its pinion to engage the toothed gear for causing a rotation of the shaft when the vehicle moves, and a strap upon the spool and connected with the bits of the horses' bridles so that a forward movement of the vehicle will cause the strap or a part thereof to be wound upon the spool of the shaft.

The invention consists of the novel construction, combination and arrangement of parts as described herein and claimed, and as illustrated in the accompanying drawing, wherein,—

Figure 1 is a broken away plan view of a vehicle showing the device applied thereto. Fig. 2 is a sectional view on line 2 2 of Fig. 1. Fig. 3 is a rear view of the vehicle. Fig. 4 is a detail relating to Fig. 1, showing a hand lever employed.

Referring now to the drawing for a more particular description, numeral 5 indicates the rear axle of a vehicle, the inner end of the hub of one of the wheels 6 thereof being provided with a toothed gear 7. The rear axle, near its ends, is provided with a pair of clips respectively indicated at 8 and 9. Secured upon the lower side of the axle by means of the clip 8 is an angular bracket 10 upon which is pivotally mounted at 11, a rock lever 12, said rock lever being disposed rearwardly of the rear axle, its lower arm $a$, as best shown in Fig. 2, being provided with a spring 13 which is connected at one of its ends with the bracket 10, the upper arm $b$ of the rock lever providing bearings for the transverse shaft 14, said shaft also having bearings in a block 15 which is pivotally mounted at 16 in the clip 9, as shown in Fig. 1.

Numeral 17 indicates a spool with which the shaft is provided, and the shaft is also provided with a pinion 18 disposed adjacent to the toothed gear 7 of the hub. The spring 13 normally prevents the pinion 18 from engaging the gear 7, but the operator or driver may readily cause engagement of said parts by use of the hand lever 19. Numeral 20 indicates a flexible strap or strip which is connected with arm $b$ of the rock lever and with the hand lever 19.

In operation, when a driver leaves the vehicle, he swings the lever 19 upwardly from the slot 21 of the vehicle box, against the force of the spring 13 and causes it to be supported by any suitable means, as by disposing its free end in the recess 22. The strap 20 preferably extends forwardly from the rock lever 12 so that, for the most part, it is disposed below the vehicle box, and extends upwardly through a suitable aperture 23 formed in the bottom $c$ of the box in engagement with a roller 24 to be secured at its front end to the staple 25 of the hand lever, as shown in Fig. 4, so that when the lever is related it causes the teeth of pinion 18 to engage the teeth of the gear 7 of the wheel hub.

Numeral 26, best shown in Fig. 1, indicates a flexible strap having its rear end secured to the spool 17, its front end being connected with the bits of the bridles upon the horses (not shown) or with one of the bits, as may be desired, and since a forward movement of the vehicle, which might be caused by the team in the absence of the driver, will operate to cause the strap 26 to become wound upon the spool, said strap will be drawn rearwardly to prevent a forward movement of the team, this being the object to be attained. It will be understood that the driver thereafter must cause a release of the pinion 18 from the gear 7 before again driving, this being readily accomplished by moving the lever from the recess 22, which permits the lever to swing downwardly, and by operation of the spring 13 the shaft 14 will swing rearwardly to disengage the pinion 18, and said pinion will thereafter remain disengaged until the hand lever is again used; and the operation may be repeated as often as required.

Having fully described construction and function of parts, a further explanation relating to operation is not necessary. What I claim as my invention and desire to secure by Letters Patent is,—

In a vehicle attachment, the combination with an annular rack on the wheel hub, an angular bracket mounted on the axle, a rock lever mounted upon said bracket, a shaft having bearings in one of the arms of the rock lever, a pinion on said shaft a spring mounted on the bracket and connected with the arm of the rock lever opposite to the bearings of the shaft for controlling one of the movements of the rock lever, means for moving the rock lever against the force of the spring for causing engagement of the pinion with the annular rack to permit a rotation of the shaft, and a strap secured to the shaft to cause it to be wound thereon when the shaft is rotated.

In testimony whereof, I have affixed my signature in presence of two witnesses.

RASMUS PEDERSON.

Witnesses:
HIRAM A. STURGES,
ARTHUR H. STURGES.

Copies of this patent may be obtained for five cents each, by addressing the "Commissioner of Patents, Washington, D. C."